July 31, 1945.   M. YAWITZ ET AL   2,380,567
COMPARATOR DEVICE
Filed March 22, 1944
Fig. 1.
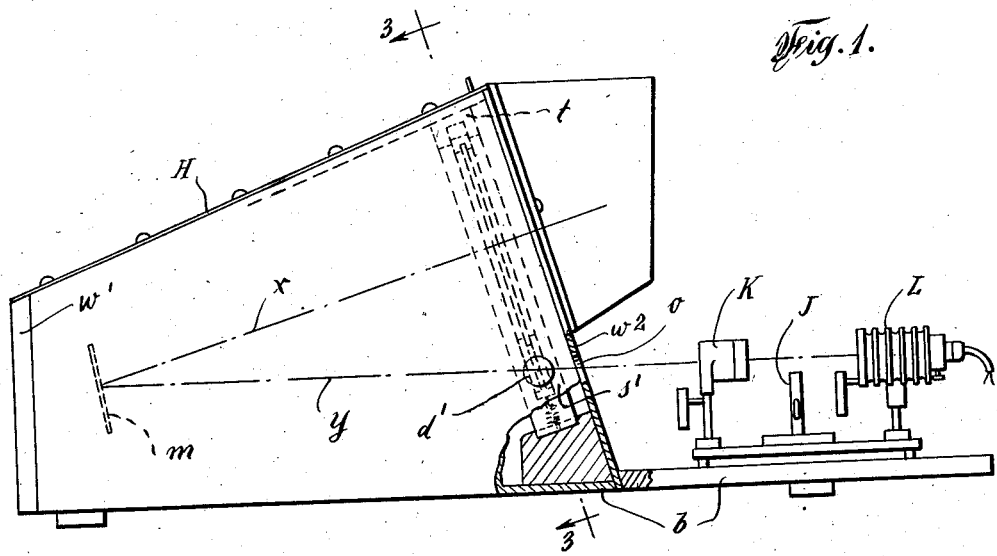
Fig. 2.
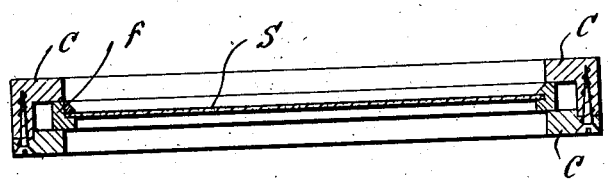
Fig. 3.   Fig. 4.
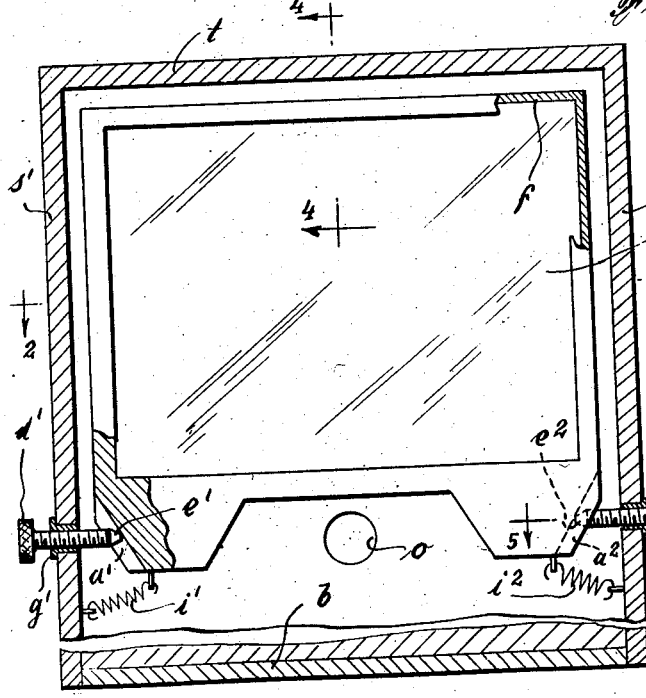
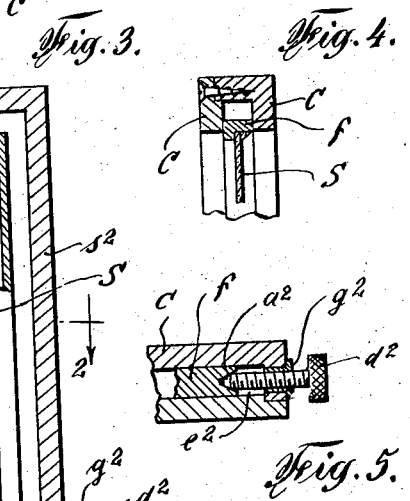
Fig. 5.
INVENTORS.
Murray Yawitz
Ignaz F. Suwa
BY
ATTORNEY Patented July 31, 1945

2,380,567

UNITED STATES PATENT OFFICE 2,380,567

COMPARATOR DEVICE

Murray Yawitz, New York, and Ignaz F. Suwa, Jackson Heights, N. Y., assignors to Fish-Schurman Corporation, New York, N. Y., a corporation of New York Application March 22, 1944, Serial No. 527,526

3 Claims. (Cl. 88—24)

This invention relates to comparator devices and more particularly to optical contour comparator devices, and has for its object the provision of an improved optical comparator device wherein means is provided to facilitate the comparative examination of the projected shadow image with the scale model drawing.

Another object is to provide means to align the projected magnified image of an object and an enlarged sketch of the contour of a standard sized object drawn to the same scale of magnification for detailed comparative examination.

Still another object is to provide a comparator device in which means is provided to project upon a translucent screen the image of an object magnified to a predetermined degree and to adjust the said screen in a plane transverse to the axis of projection of said image thereon to align a sketch of said object drawn to the same scale of magnification comparatively to the said projected image.

A further object is to provide an adjustable screen for an optical comparator device in which the adjustment provided affords means to move the screen in all directions in a fixed plane transverse to the axis of projection of an image thereon.

Other objects will be apparent as the invention is more fully hereinafter disclosed.

In accordance with these objects we have devised the optical comparator device illustrated in the drawing, of which the following is a full and complete description:

In the drawing —

Fig. 1 is a side-elevational view, partly in section of the comparator device of the present invention;

Fig. 2 is a sectional view along plane 2—2 of Fig. 3;

Fig. 3 is a sectional view along plane 3—3 of Fig. 1;

Fig. 4 is a sectional view along plane 4—4 of Fig. 3; and

Fig. 5 is a sectional view along plane 5—5 of Fig. 3.

Referring to the drawing, the optical comparator device of the present invention consists of a hood H having top (t), bottom (b), side ($s^1$, $s^2$) and back ($w^1$) walls arranged to be substantially impenetrable by light radiation and having a front wall ($w^2$) provided with an opening $o$ through which a beam of light radiation may be projected into the said hood H onto a reflecting mirror $m$ (shown in dotted line) and an adjustable screen S upon which the said beam may be reflected from within the hood interior by said mirror, together with means L to project a beam of light radiation having an axis X through the opening $o$ into said hood H onto said mirror $m$ and means J to sustain the object to be examined in the path of the beam of light radiation from means L and means K to magnify the shadow image of the object to the desired scale for optical comparison on screen S.

Screen S consists of a ground glass plate mounted in frame $f$ which frame $f$ is slidably seated in channel frame C forming a part of the front wall ($w^2$), and mounted therein in a position to be substantially normal to the axis (X) of light reflection from mirror $m$. The opposite bottom corners of frame ($f$) are beveled off and channeled slightly to provide a trackway $a^1$—$a^2$ for the pointed ends ($e^1$—$e^2$) of adjustable thumb screws $d^1$—$d^2$ passing through threaded bushings $g^1$—$g^2$ in side walls $s^1$ and $s^2$. Means such as springs $i^1$ and $i^2$ are provided to maintain the ends $e^1$—$e^2$ of screws $d^1$ and $d^2$ in contact with trackways $a^1$ and $a^2$.

With the arrangement shown, it is believed apparent that by independent and simultaneous operation of thumb-screws $d^1$ and $d^2$ the screen S may be shifted up and down and sideways within channel frame C and may be tipped up or down about an axis defined by the point of either screw $d^1$ and $d^2$, thereby to obtain the comparative location of the contour of a drawing of the projected image, drawn to the same scale of magnification obtained in means K, in a position for detailed comparative examination with the projected shadow image of the object.

The major advantage of the present invention over those heretofore provided is that the scale of magnification of the shadow image of the object produced on screen S may be fixed to a determined scale and does not vary with the shifting of screen S, thereby eliminating all adjustments except that to obtain a comparative location of the drawing disposed in the front face of the screen S with the projected shadow image on the rear face for comparative examination. This greatly facilitates examination by unskilled operators.

From the above description of the invention taken with the drawing it is believed apparent that the invention is adapted to wide modification without essential departure therefrom and all such are contemplated as may fall within the scope of the following claims.

What we claim is:

1. In an optical comparator device including a radiation impermeable hood, a translucent screen disposed in closure position in an opening in one wall of said hood, and means to project a shadow image of an object to be compared upon the inner surface of said screen, an improved means to move said screen laterally in all directions in a fixed plane normal to the axis of projection of said shadow image thereby to bring a drawing fixedly located upon the front face of said screen into comparative position with the shadow image on the rear face of said screen, said improved means comprising a channel frame for said screen, the depth of said frame being sufficient to cover the screen edges in all positions of lateral movement, beveled corners on the bottom of said screen, adjustable thumb screws passing through the bottom walls of the channel frame with the forward ends thereof engaging said beveled corners, and spring means maintaining the said screen in contact with said forward screw ends in all positions of forward and rearward adjustment provided therein.

2. In a comparator device, a radiation impermeable hood, a translucent screen located in one wall of said hood, means projecting a magnified shadow image of an object upon the inner surface of said screen, means sustaining a drawing to be compared with said shadow image upon the front face of said screen and means to move the screen laterally in all directions in a plane normal to the axis of projection of said shadow image to bring the drawing into comparative position with said shadow image, said means including a channel frame for said screen, the depth of said frame being sufficient to cover the screen edges in all positions of lateral movement, beveled corners on the bottom of said screen, adjustable thumb screws passing through the bottom walls of the channel frame with the forward ends thereof engaging said beveled corners, and spring means maintaining the said screen in contact with said forward screw ends in all positions of forward and rearward adjustment provided therein.

3. In an optical comparator device having a radiation impermeable hood with a translucent screen in one wall thereof on the rear face of which a shadow image is projected for comparison with a drawing disposed upon the front face of said screen, means to shift the said screen laterally in a plane normal to the axis of projection of said shadow image, said means comprising a channel frame enclosing the screen edges, the depth of the channel being sufficient to cover the screen edge in all positions of lateral displacement, beveled corners on the bottom of said screen, an adjustable thumb screw extending through the base of each side of the said channel frame in a position permitting the forward ends of the screws to engage the beveled corners on said screen, and spring means to maintain the said screen in contact with said screw ends along said beveled corners in all provided positions of advancement and retraction of said screws.

MURRAY YAWITZ.
IGNAZ F. SUWA.